United States Patent
Komoriya

(10) Patent No.: US 10,913,238 B2
(45) Date of Patent: Feb. 9, 2021

(54) METHOD FOR MANUFACTURING COMPOSITE MEMBER

(71) Applicant: TOYOTA JIDOSHA KABUSHIKI KAISHA, Toyota (JP)

(72) Inventor: Kazuki Komoriya, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 177 days.

(21) Appl. No.: 16/217,861

(22) Filed: Dec. 12, 2018

(65) Prior Publication Data
US 2019/0193375 A1 Jun. 27, 2019

(30) Foreign Application Priority Data
Dec. 25, 2017 (JP) .................. 2017-247591

(51) Int. Cl.
*B32B 7/03* (2019.01)
*B21D 7/00* (2006.01)
(Continued)

(52) U.S. Cl.
CPC ............ *B32B 7/03* (2019.01); *B21D 7/00* (2013.01); *B32B 15/20* (2013.01); *B32B 37/15* (2013.01);
(Continued)

(58) Field of Classification Search
CPC .......... B32B 7/03; B32B 15/14; B32B 15/20; B32B 37/15; B32B 38/0012;
(Continued)

(56) References Cited

U.S. PATENT DOCUMENTS 4,477,513 A * 10/1984 Koga .............. B29C 63/0021
                                                                442/378
6,235,409 B1 * 5/2001 Serafin .............. B32B 15/08
                                                                148/535
(Continued)

FOREIGN PATENT DOCUMENTS

JP 2003129611 A 5/2003
JP 2012187861 A 10/2012

OTHER PUBLICATIONS

Machine Translation for JP2003-129611 A (Year: 2003).*

*Primary Examiner* — Christopher J Besler
*Assistant Examiner* — Christine Bersabal
(74) *Attorney, Agent, or Firm* — Oliff PLC

(57) ABSTRACT

A method manufactures a composite member that can exert a sufficient effect of reinforcing a metal part with a fiber-reinforced resin material when the metal part is obtained by bending a tubular member. The method firstly bends a tubular metal member having a plate-like outer wall extending in the longitudinal direction so that compressive stress acts on the outer wall to manufacture the metal part. Next the method prepares a plate-like metal plate. Next the method attaches a fiber-reinforced resin material to a surface of the prepared metal plate, the fiber-reinforced resin material including a fiber substrate containing reinforcement fibers having one orientation direction and impregnated with uncured thermosetting resin, followed by thermally curing of the thermosetting resin to prepare a reinforcement member. Next the method joins the metal plate of the reinforcement member to the surface of the outer wall of the metal part.

4 Claims, 8 Drawing Sheets

(51) Int. Cl.
*B32B 15/20* (2006.01)
*B32B 37/15* (2006.01)
*B32B 38/00* (2006.01)

(52) U.S. Cl.
CPC .... *B32B 38/0012* (2013.01); *B32B 2260/021* (2013.01); *B32B 2260/046* (2013.01); *B32B 2262/106* (2013.01)

(58) Field of Classification Search
CPC ........ B32B 2260/021; B32B 2260/046; B32B 2260/106; B29C 65/48; B29C 66/41; B29C 66/7422; B29C 66/80; B21D 7/00; B23K 9/0026; B60J 5/0447; B60R 19/04; E04C 3/07
See application file for complete search history.

(56) References Cited

U.S. PATENT DOCUMENTS

| | | | | |
|---|---|---|---|---|
| 6,468,613 | B1 * | 10/2002 | Kitano | B32B 15/08 428/35.8 |
| 7,077,438 | B2 * | 7/2006 | Albers | B60J 5/0447 293/102 |

* cited by examiner

METHOD FOR MANUFACTURING COMPOSITE MEMBER

CROSS REFERENCE TO RELATED APPLICATIONS

The present application claims priority from Japanese patent application JP 2017-247591 filed on Dec. 25, 2017, the content of which is hereby incorporated by reference into this application.

BACKGROUND

Technical Field

The present disclosure relates to a method for manufacturing a composite member including a tubular metal part and a fiber-reinforced resin material to reinforce the metal part.

Background Art

Composite members have been conventionally manufactured, which include a metal part to which a fiber-reinforced resin material including polymer resin impregnated with reinforcement fiber is attached for reinforcement. JP 2003-129611 A discloses such a composite member that is developed assuming the bending load acting on a tubular member made of aluminum alloy. This composite member includes a fiber-reinforced resin material placed on the surface of the tubular member where the bending load acts. Such a composite member is manufactured by directly attaching the fiber-reinforced resin material to the surface of the metal part with adhesive, for example.

SUMMARY

To reinforce a metal part obtained by bending such a tubular member, a fiber-reinforced resin material including reinforcement fibers having one orientation direction and impregnated with uncured thermosetting resin may be attached to the metal plate, and then the thermally setting resin may be thermally cured. When such a fiber-reinforced resin material including uncured thermosetting resin is attached to the outer wall of the metal part that is bent inwardly, followed by thermally curing of the thermosetting resin, the sufficient reinforcement of the metal part may not be achieved.

This is because compressive stress in the longitudinal direction acts on the outer wall of the tubular member on the inside of the bending direction during bending, and so the outer wall is deformed like waving. This forms alternate concave parts and convex parts on the surface of the outer wall. When a fiber-reinforced resin material is attached to such a surface having alternate concave parts and convex parts, reinforcement fibers having one orientation direction also will follow these concave parts and convex parts to undulate. As a result, the orientation of the reinforcement fibers is disturbed, and so the expected reinforcing effect from the reinforcement fibers cannot be obtained sufficiently.

In view of the above, the present disclosure provides a method for manufacturing a composite member that can exert a sufficient effect of reinforcing a metal part with a fiber-reinforced resin material when the metal is obtained by bending a tubular member.

In view of the above, a method for manufacturing a composite member according to the present disclosure manufactures a composite member including a tubular metal part and a fiber-reinforced resin material to reinforce the metal part. The method includes: bending a tubular metal member having a plate-like outer wall extending in the longitudinal direction so that compressive stress acts on the outer wall to manufacture the metal part; preparing a plate-like metal plate or preparing a metal plate by bending or curving the plate-like metal plate in accordance with a bending shape of the metal part; attaching a fiber-reinforced resin material to a surface of the prepared metal plate, the fiber-reinforced resin material including a fiber substrate containing reinforcement fibers having one orientation direction and impregnated with uncured thermosetting resin, followed by thermally curing of the thermosetting resin to prepare a reinforcement member; and joining the metal plate of the reinforcement member to a surface of the outer wall of the metal part.

The present disclosure manufactures a metal part by bending a tubular metal member so that compressive stress acts on the outer wall. Such compressive stress acting on the outer wall in the longitudinal direction deforms the outer wall to wave in the longitudinal direction. This forms alternate concave parts and convex parts at the surface of the outer wall along the longitudinal direction.

The method of the present disclosure firstly prepares a plate-like metal plate instead of directly attaching a fiber-reinforced resin material to the surface of the outer wall. Alternatively the method prepares a metal plate that is obtained by bending or curving the plate-like metal plate in accordance with a bending shape of the metal part.

Next the method attaches a fiber-reinforced resin material to the prepared metal plate. The surface of the metal plate does not have alternate concave parts and convex parts as in the surface of the outer wall, and is flat or is a flat surface that is bent or curved in a predetermined direction. The orientation of the reinforcement fibers of the fiber-reinforced resin material attached to such a surface therefore is not disturbed. In this way, thermosetting resin is thermally cured while keeping the orientation of the reinforcement fibers. As a result, the reinforcement member obtained can have reinforcement fibers that are oriented well. The metal plate of the thus obtained reinforcement member is joined to the surface of the outer wall of the metal part, whereby the composite member obtained can be sufficiently reinforced with the fiber-reinforced resin material.

Note here that when the fiber substrate of the fiber-reinforced resin material includes reinforcement fibers having one orientation direction, the reinforcement member can exert the reinforcing effect irrespective of the orientation direction as compared with the configuration including a fiber-reinforced resin material directly attached to the bent metal part. Preferably the fiber-reinforced resin material is attached to the surface of the metal plate at the step of manufacturing the reinforcement member so that the reinforcement fibers are oriented along the longitudinal direction of the metal part.

For example, when the fiber-reinforced resin material is directly attached to the metal part so that the reinforcement fibers are oriented along the longitudinal direction of the surface of the outer wall, the reinforcement fibers easily meander continuously along the longitudinal direction and are disturbed. This greatly degrades the reinforcing effect from the reinforcement fibers. On the contrary, the method of this aspect manufactures the reinforcement member so that the reinforcement fibers are oriented along the longitudinal direction of the metal part. This avoids the meandering of the reinforcement fibers along the longitudinal direction of the metal part and can place the reinforcement fibers that are oriented well. As a result, the effect of reinforcing of the metal part with the reinforcement member can improve.

The tubular member (i.e., the metal part) may be made of any metals, such as stainless steel, copper alloy, and aluminum alloy. In a preferable aspect, the metal part is made of aluminum alloy.

When a fiber-reinforced resin material is directly attached to a metal part, followed by thermally curing, aluminum alloy of the metal part also is heated, which may cause a decrease in the strength of the metal part due to overaging. According to this aspect, the thermosetting resin is thermally cured during the step of manufacturing the reinforcement member, which can avoid such a decrease in the strength of the metal part.

When the metal part is made of aluminum alloy, the material of the reinforcement fibers is not limited especially as long as they can reinforce the metal part, and the materials include carbon fibers and glass fibers. In a preferable aspect, the reinforcement fibers are carbon fibers.

For the configuration of a fiber-reinforced resin material directly attached to a metal part, a contact of aluminum alloy of the metal part with carbon in the carbon fibers may cause galvanic corrosion of the aluminum alloy. To avoid this, coating, such as electrodeposition coating, has to be applied to the surface of the metal part. On the contrary, the fiber-reinforced resin material of this aspect is joined to the metal part via the metal plate, and so such a coating is not necessary for the metal part. Especially electrodeposition coating applied to a metal part may degrade the strength of the metal part due to overaging because aluminum alloy of the metal part also is heated. This aspect can avoid such degradation of the strength.

A method for manufacturing a composite member according to the present disclosure can exert a sufficient effect of reinforcing a metal part with a fiber-reinforced resin material when the metal part is obtained by bending a tubular member.

DETAILED DESCRIPTION

Figure 1:
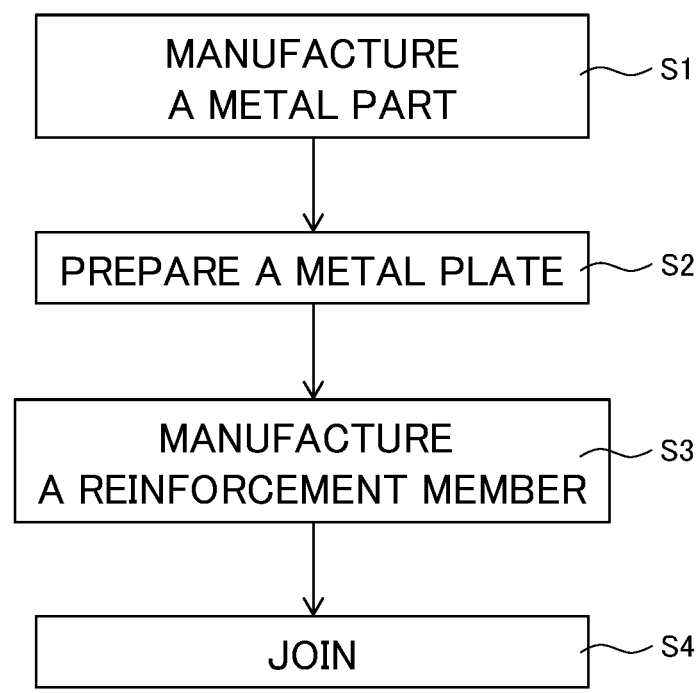
FIG. 1 is a flowchart of a method for manufacturing a composite member according to one embodiment of the present disclosure.
Figure 8:
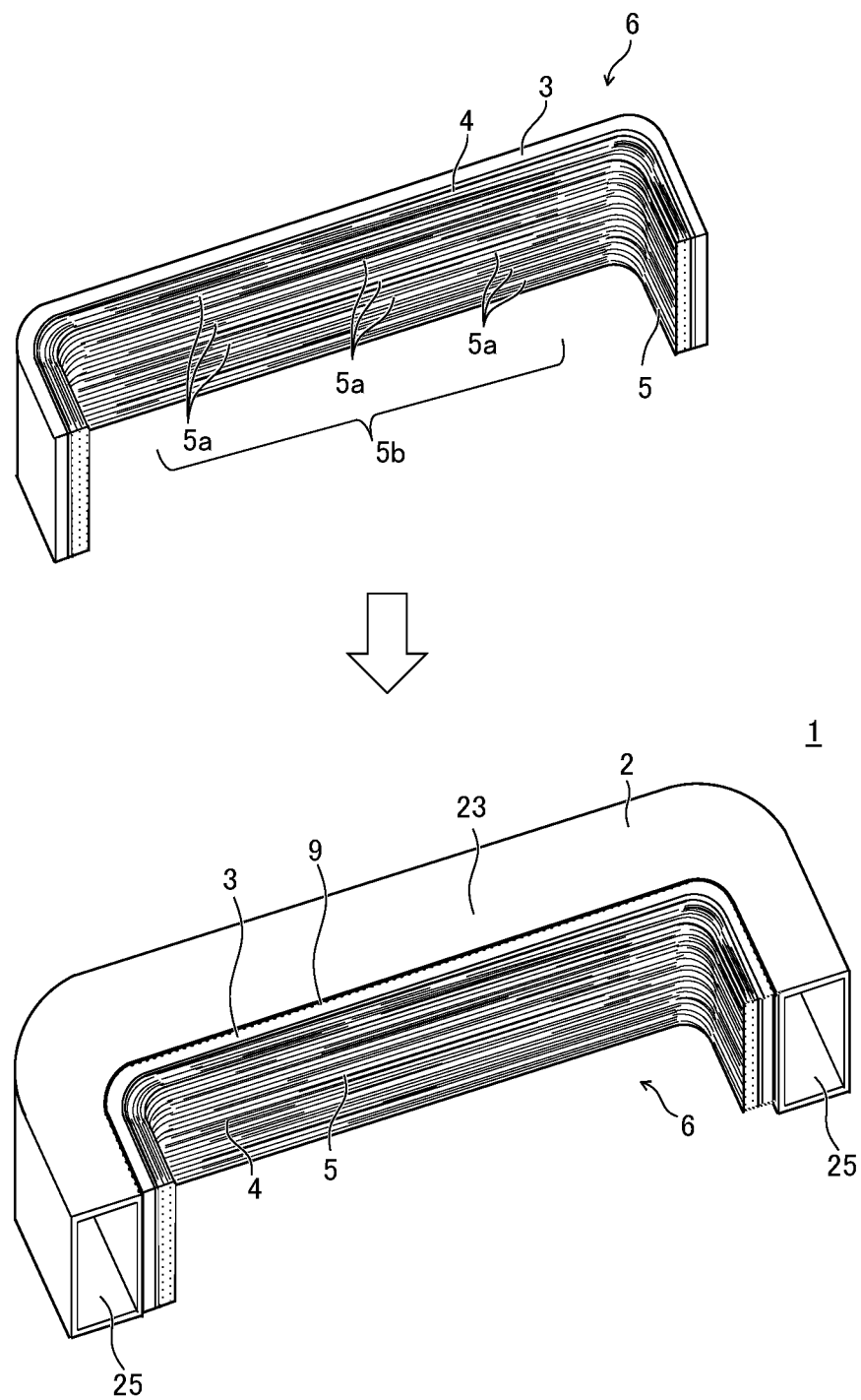
FIG. 8 is a schematic view to explain the step of joining a reinforcement member, which is manufactured with the metal plate in FIG. 7, to a metal part.

Referring to FIGS. 1 and 8, the following describes some embodiments of the present disclosure.

Figure 5:
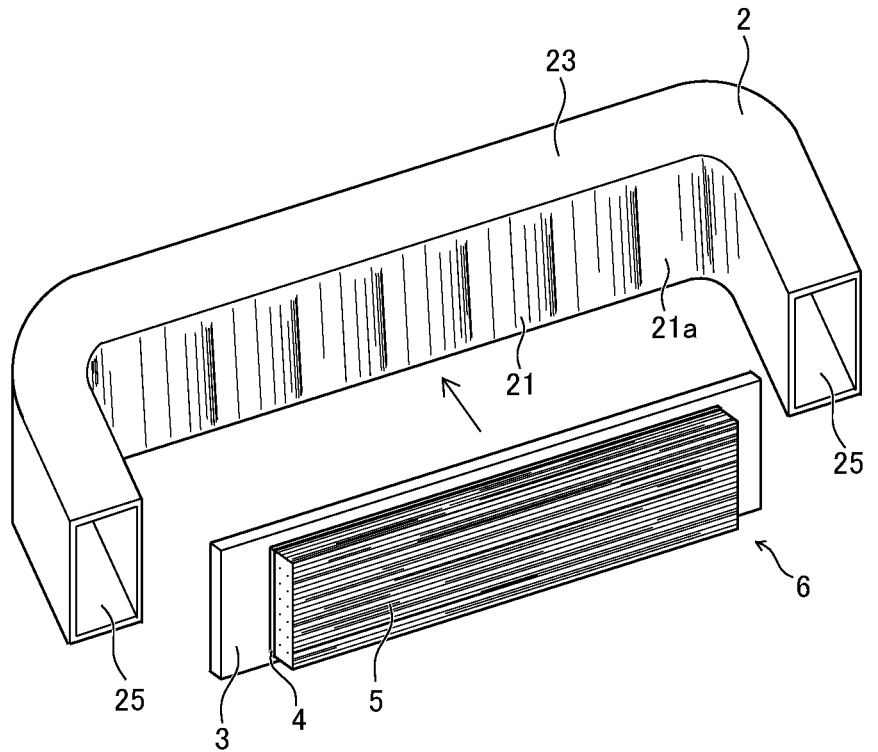
FIG. 5 is a schematic view to explain the joining step in FIG. 1.
Figure 5:
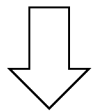
Figure 5:
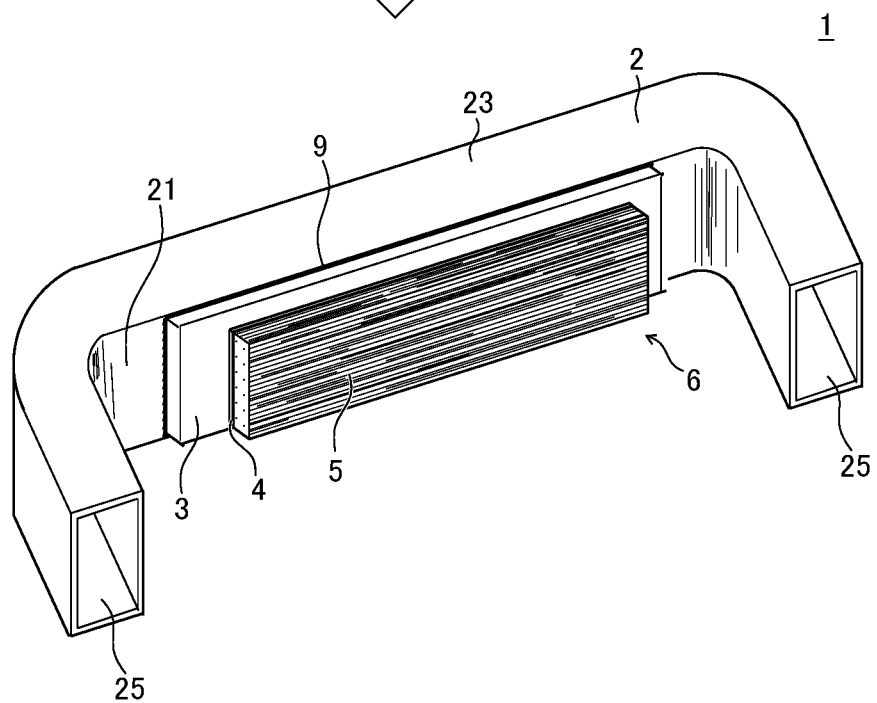

As shown in the lower drawing of FIG. 5 or in the lower drawing of FIG. 8, the present embodiment manufactures a composite member 1 including a tubular metal part 2 and a fiber-reinforced resin material 5 to reinforce the metal part 2. Referring to FIG. 1, the following describes this manufacturing method in details.

1. Step S1 of Manufacturing Metal Part

Firstly Step S1 of manufacturing a metal part is performed. At this step, a tubular metal part 2 to be reinforced is manufactured. Specifically as shown in the upper drawing of FIG. 2, a tubular member 2A made of metal is prepared, which has plate-like outer walls 21A to 24A extending in the longitudinal direction.

The tubular member 2A of the present embodiment is a rectangular square pipe having a hollow inside of it. The tubular member 2A includes a pair of opposed outer walls 21A and 22A and a pair of opposed outer walls 23A and 24A that are continuous to the outer walls 21A and 22A. These outer walls 21A to 24A define a hollow 25 along the longitudinal direction of the tubular member 2A.

The tubular member may include one or more ribs that extend between the opposed outer walls 21A and 22A. This can increase the strength of a metal part to be manufactured, which will be described later. In the present embodiment, all of the outer walls 21A to 24A are like plates. The outer walls other than the outer wall 21B may be curved as long as the outer wall 21B is like a plate that will be on the inside of the bending direction after bending (where compressive stress acts in the longitudinal direction). In this way, the shape of the tubular member is not limited especially.

The tubular member 2A to be prepared is made of metal, and materials of the tubular member include carbon steel, stainless steel, and aluminum alloy. In the present embodiment, aluminum alloy is used. The aluminum alloys include Al—Cu based aluminum alloy, Al—Cu—Mg based aluminum alloy, Al—Cu—Mg—Ni based aluminum alloy, Al—Si based aluminum alloy, Al—Si—Mg based aluminum alloy and Al—Si—Cu—Mg based aluminum alloy.

Figure 2:
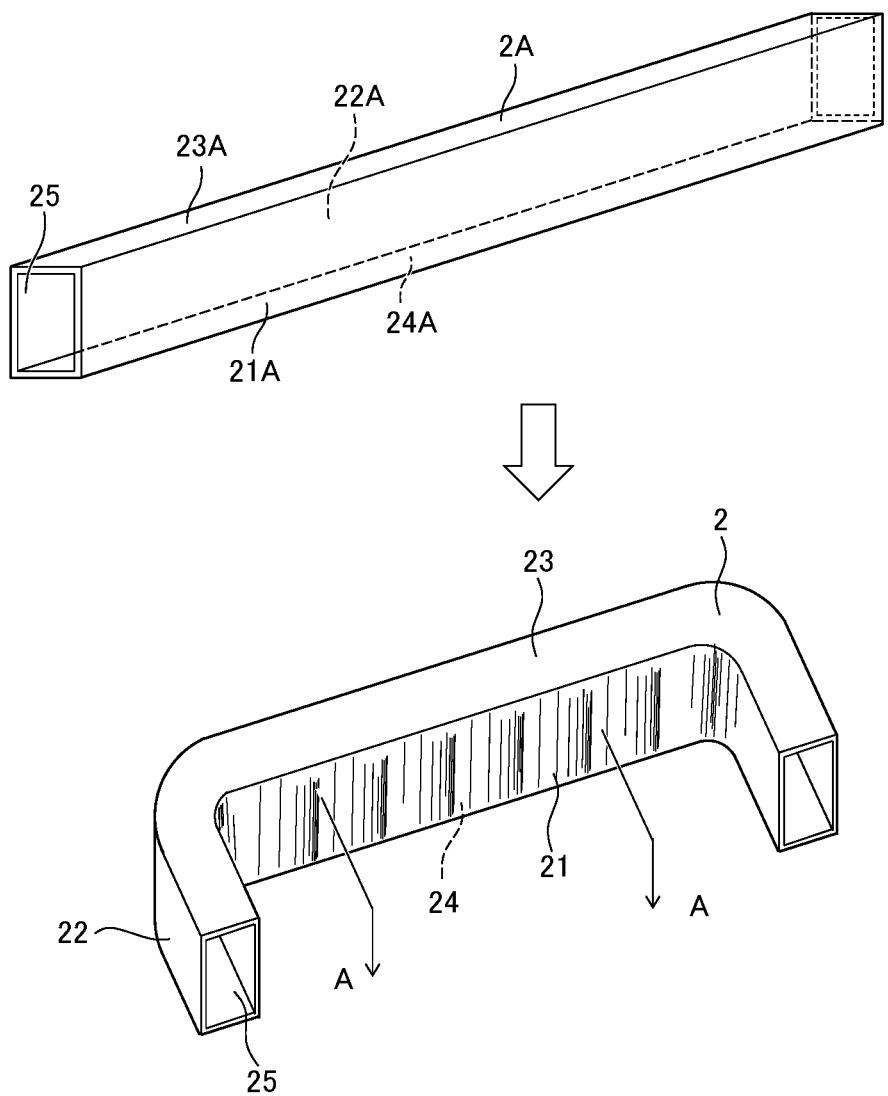
FIG. 2 is a schematic view to explain the step of manufacturing a metal part in FIG. 1.

Next as shown in the lower drawing of FIG. 2, the prepared tubular member 2A made of metal is bent so that the outer wall 21A is on the inside of the bending direction and the outer wall 22A is on the outside of the bending direction, whereby a metal part 2 is manufactured. In the present embodiment, the tubular member 2A is bent on both sides.

As shown in the upper drawing of FIG. 2, the outer wall 21A and the outer wall 22A before bending have the same length along the longitudinal direction of the tubular member 2A. After bending, however, the length of the outer wall 21 on the inside of the bending direction along the longitudinal direction is shorter than the length of the outer wall 22 on the outside of the bending direction.

Figure 3A:
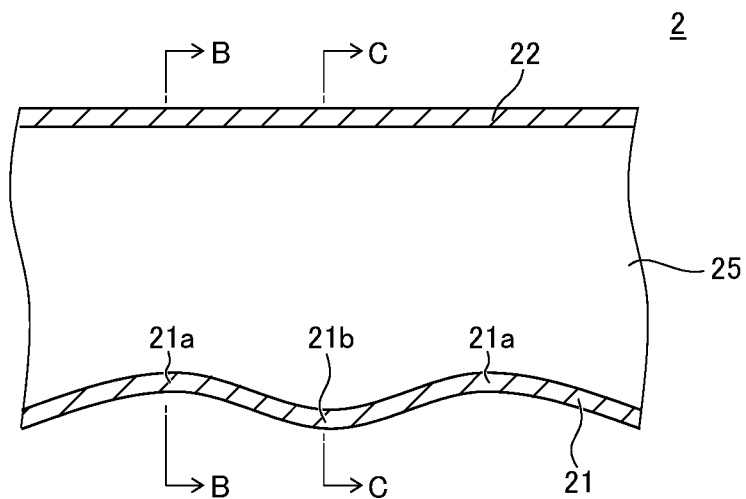
FIG. 3A is a cross-sectional view taken along the arrows A-A of FIG. 2.

When the tubular member 2A is bent in this way so that the outer wall 21A is on the inside of the bending direction to manufacture the metal part 2, compressive stress acts on the outer wall 21A in the longitudinal direction. As a result, as shown in FIG. 3A, the outer wall 21 of the metal part is deformed like waves in the longitudinal direction. In other words, the method of the present embodiment bends the tubular member so that compressive stress acts on the plate-like outer wall 21 along the longitudinal direction.

Figure 3B:
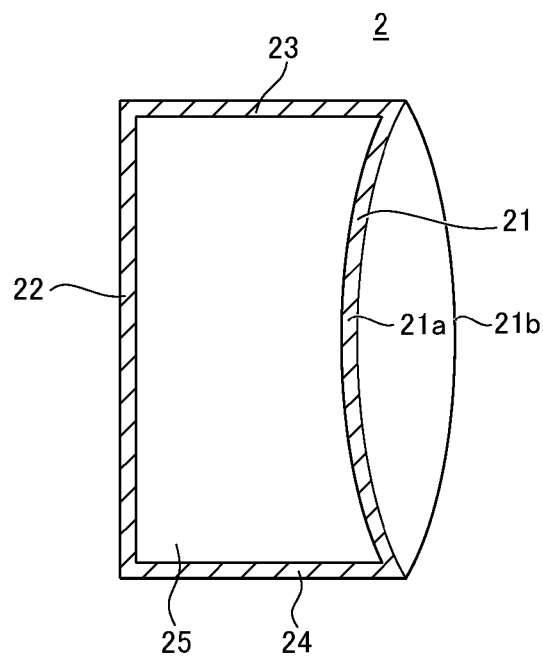
FIG. 3B is a cross-sectional view taken along the arrows B-B of FIG. 3A.
Figure 3C:
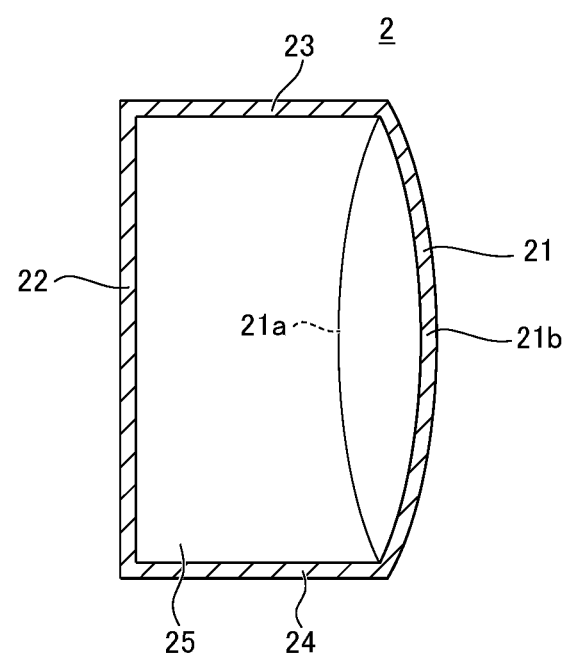
FIG. 3C is a cross-sectional view taken along the arrows C-C of FIG. 3A.

Such deformation like waves forms alternate concave parts 21a and convex parts 21b at the surface of the outer wall 21 along the longitudinal direction. As shown in FIG. 3B, the concave part 21a is recessed in the width direction of the outer wall 21 as well, and as shown in FIG. 3C, the convex part 21b swells in the width direction of the outer wall 21 as well.

When a fiber-reinforced resin material is attached to such a surface having alternate concave parts 21a and convex parts 21b, reinforcement fibers having one orientation direction will meander (undulate) so as to follow such a shape of the surface. This disturbs the orientation of the reinforcement fibers, and so the expected effect from the reinforcement fibers cannot be obtained sufficiently. To avoid this, the method of the present embodiment prepares a metal plate 3 as shown in the following series of steps, and manufactures a reinforcement member 6 with this plate.

2. Step S2 of Preparing Metal Plate

Figure 4:
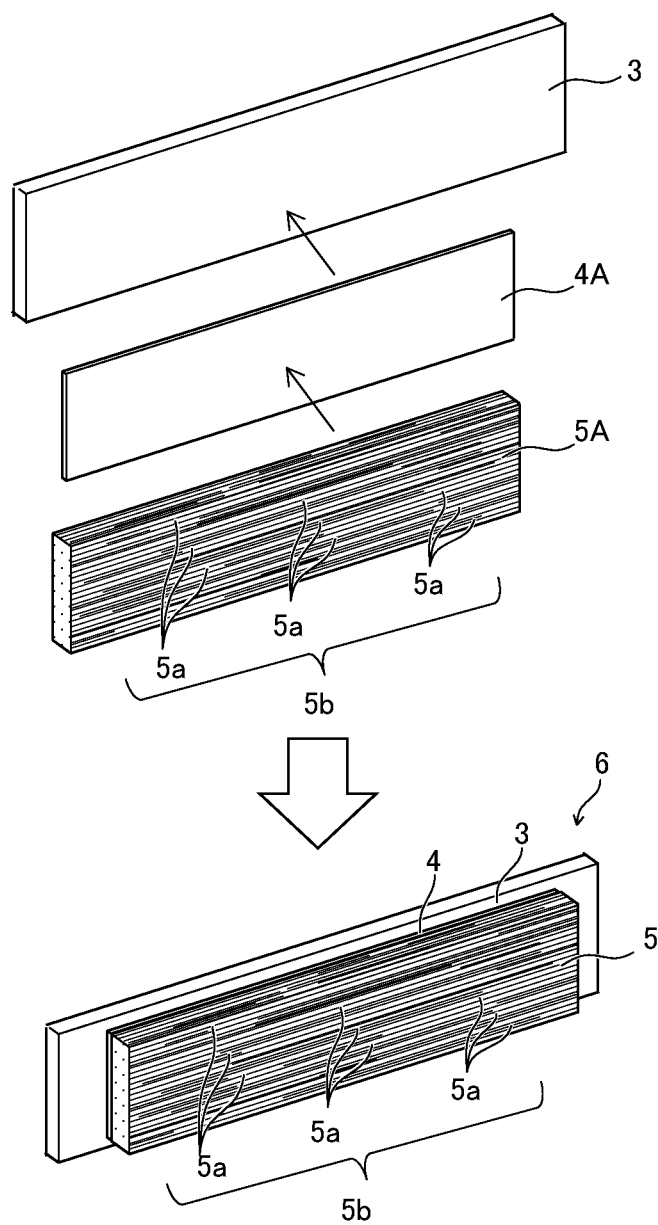
FIG. 4 is a schematic view to explain the step of manufacturing a reinforcement member in FIG. 1.

Specifically Step S2 of preparing a metal plate is performed. At this step, a metal plate 3 is prepared, which is joined to the surface of the outer wall 21 at the joining step S4 described later. The metal plate 3 of the present embodiment is joined to a part of the surface of the outer wall 21 that is not substantially bent by the bending. The metal plate 3 to be prepared is therefore a flat plate as shown in FIG. 4.

The size, the thickness and the material of the metal plate 3 are not limited especially as long as it does not disturb the orientation of the reinforcement fibers described later and can be joined to the metal part 2. The metal plate 3 does not need to reinforce the metal part 2 directly, and the fiber-reinforced resin material 5 described later reinforces the metal part 2. The metal plate 3 therefore may be thinner than the outer wall 21. This can make the manufactured composite member 1 lighter in weight.

The materials of the metal plate 3 include carbon steel, stainless steel, and aluminum alloy. In the present embodiment, aluminum alloy is used. The aluminum alloys include the materials listed for the tubular member 2A. The metal plate 3 made of aluminum alloy can increase the quality of joining of the metal plate 3 to the metal part 2 made of aluminum alloy. Note here that when the reinforcement fibers described later are carbon fibers, anticorrosive electrodeposition coating may be applied to the surface of the metal plate 3 to which the fiber-reinforced resin material 5 is to be attached so as to avoid a contact with the reinforcement fibers.

3. Step S3 of Manufacturing Reinforcement Member

Next, step S3 of manufacturing a reinforcement member is performed. At this step, firstly as shown in FIG. 4, a fiber-reinforced resin material 5A is attached to the surface of the prepared metal plate 3 via thermosetting adhesive 4A. The fiber-reinforced resin material 5A is a prepreg including a fiber substrate 5b containing reinforcement fibers 5a having one orientation direction and impregnated with uncured thermosetting resin.

More specifically the fiber-reinforced resin material 5A is attached to the surface of the metal plate 3 so that the reinforcement fibers 5a, which reinforce the metal part 2, are oriented along the longitudinal direction of the metal part 2. Alternatively, when the reinforcement fibers 5a have one orientation direction, the reinforcement fibers 5a may be oriented to intersect with the longitudinal direction of the metal part 2, for example.

Next, the attached fiber-reinforced resin material 5A is heated to thermally cure the thermosetting resin. At this time, the adhesive 4A also is cured. This can achieve the reinforcement member 6 including the fiber-reinforced resin material 5 attached to the metal plate 3 via the adhesive layer 4.

In the present embodiment, the surface of the metal plate 3 does not have alternate concave parts and convex parts as in the surface of the outer wall 21, and is flat. The reinforcement fibers 5a of the fiber-reinforced resin material 5A attached to the surface therefore does not undulate, and so the orientation of the fibers is not disturbed.

The attachment face of the metal plate 3 is a flat face (simple surface). This can prevent air from entering between the metal plate 3 and the fiber-reinforced resin material 5A, and void hardly occurs inside of the fiber-reinforced resin material 5A.

In this way, thermosetting resin is thermally cured while keeping the orientation of the reinforcement fibers 5a and allowing the fiber-reinforced resin material 5A substantially free from voids at the interface and inside of the material. As a result, the reinforcement member 6 obtained can have the excellent effect of reinforcing with the reinforcement fibers 5a.

The fiber substrate 5b may be woven, including plain-woven, twill-woven, or satin-woven as long as it includes reinforcement fibers having one orientation direction. The fiber substrate 5b of the present embodiment may include the reinforcement fibers 5a that are aligned parallel for the orientation of the reinforcement fiber 5a along the longitudinal direction of the metal part 2, and or may include such fibers partially.

The reinforcement fibers 5a include glass fibers, carbon fibers, aramid fibers, alumina fibers, boron fibers, steel fibers, PBO fibers and high-strength polyethylene fibers. The reinforcement fibers 5a of the present embodiment are carbon fibers.

The thermosetting resins for impregnation of the fiber substrate 5b include epoxy resins, phenolic resins, melamine resins, urea resins, silicone resins, maleimide resins, vinylester resins, unsaturated polyester resins, cyanate resins, and polyimide resins. The thermosetting resin of the present embodiment is epoxy resin.

The adhesive 4A is thermosetting adhesive. From the viewpoint of the fiber-reinforced composite material 5A, resin of the same type as the resin for impregnation of the fiber substrate 5b is preferable. Instead of the adhesive 4A, an adhesive sheet may be used. Since the metal plate 3 of the present embodiment is made of aluminum alloy, the adhesive 4A is preferably placed so that the reinforcement fibers 5a including carbon fibers do not come in direct contact with the metal plate 3. This can avoid a contact between aluminum alloy and carbon and so can suppress galvanic corrosion of the aluminum alloy.

The materials of the metal plate 3 and of the reinforcement fibers 5a may be selected so as to avoid the corrosion and so that the fiber-reinforced resin material 5A can be directly attached to the metal plate 3. In such a case, the adhesive 4A is not necessary. When the metal plate 3 is made of steel, for example, such corrosion can be avoided even when the reinforcement fibers 5a are carbon fibers.

4. Step S4 of Joining

Next, step S4 of joining is performed. At this step, the reinforcement member 6 is joined to the tubular metal part 2 as shown in FIG. 5. Specifically the metal plate 3 of the reinforcement member 6 is joined to the surface of the outer wall 21 of the metal part 2. In the present embodiment, the metal plate 3 of the reinforcement member 6 covers a part of the surface of the outer wall 21. Then, welding, such as arc welding, is performed continuously between the metal plate 3 and the outer wall 21 along the edge of the metal plate 3.

Figure 6A:
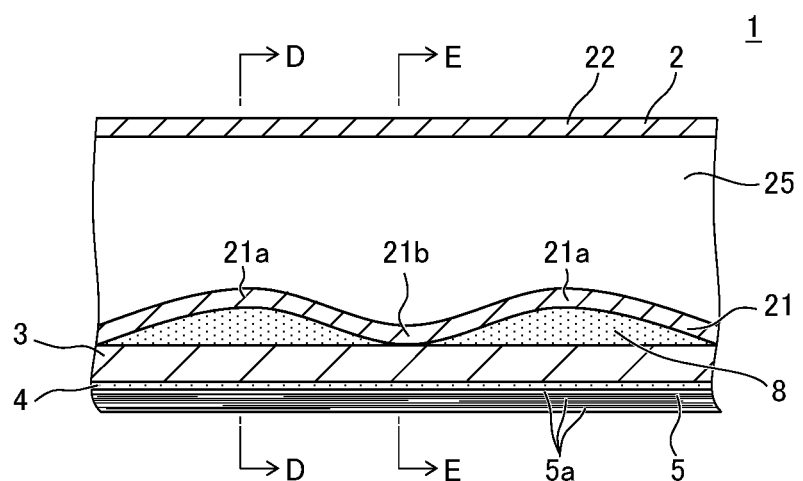
FIG. 6A is a cross-sectional view of a composite member at the position in FIG. 3A.
Figure 6B:
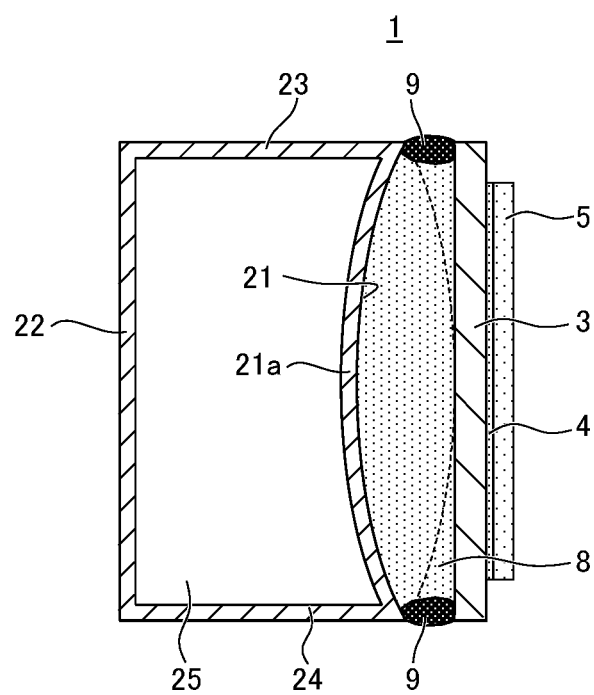
FIG. 6B is a cross-sectional view taken along the arrows D-D of FIG. 6A.
Figure 6C:
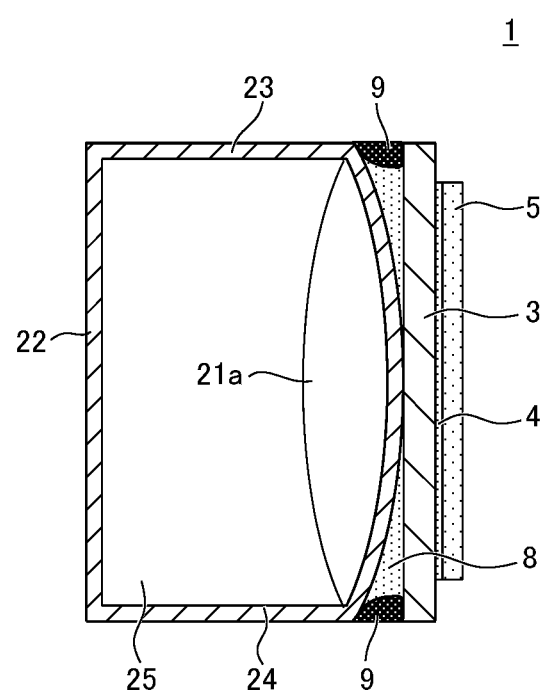
FIG. 6C is a cross-sectional view taken along the arrows E-E of FIG. 6A.

As a result, as shown in FIGS. 6A to 6C, the metal plate 3 is joined to the outer wall 21 at the edge via the welding part 9. As in the present embodiment, a filling material 8, such as adhesive, may be placed as needed between the metal plate 3 and the outer wall 21 before the welding. This removes the gap between the metal plate 3 and the outer wall 21 and can increase the strength of the obtained composite member 1. When the filling material 8 is adhesive, the joining strength between the metal plate 3 and the outer wall 21 can increase.

In the present embodiment, welding is performed continuously along the edge of the metal plate 3. Instead, welding is performed at spots along the edge of the metal plate 3. In the present embodiment, the filling material 8 is placed between the metal plate 3 and the outer wall 21. This filling material 8 may be omitted when the recessing of the concave part 21a and the swelling of the convex part 21b at the outer wall 21 are small.

In the present embodiment, the fiber-reinforced resin material 5 is not directly attached to the metal part 2. Instead, the fiber-reinforced resin material 5 is attached to the metal plate 3 having a flat surface, followed by thermally curing. This allows the reinforcement of the metal part 2 with the reinforcement member 6 that keeps the orientation of the reinforcement fibers 5a.

The reinforcement fibers 5a therefore do not meander, and the reinforcement fibers 5a that are oriented well can be placed along the longitudinal direction of the metal part 2. As a result, the effect of reinforcing the metal part 2 with the reinforcement member 6 can increase.

The thermosetting resin is thermally cured during the preparation of the reinforcement member 6, and so the metal part 2 is not thermally affected during the thermal curing. This means that when the metal part 2 is made of aluminum alloy, the aluminum alloy does not deteriorate in strength due to overaging by heat during the thermal curing.

Since the metal plate 3 of the reinforcement member 6 and the metal part 2 are joined by welding, joining is between the metal materials. This can increase the joining strength between the metal plate 3 and the outer wall 21. Note here that the metal plate 3 and the metal part 2 are joined by welding in the present embodiment, and they may be joined by a component, such as a rivet, a screw, or a bolt. In this case, the metal plate 3 of the reinforcement member 6 serves as an underlying layer for the fiber-reinforced resin material 5, which can prevent the breakage of the fiber-reinforced resin material 5 due to external force applied by hole drilling before joining or external force during joining. The metal plate 3 and the metal part 2 may be joined with adhesive only, or they may be frictional-joined.

For the configuration of a fiber-reinforced resin material directly attached to a metal part, a contact of aluminum alloy of the metal part with carbon in the carbon fibers may often cause galvanic corrosion of the aluminum alloy. To avoid this, coating, such as electrodeposition coating, has to be applied to the surface of the metal part. On the contrary, the fiber-reinforced resin material 5 of the present embodiment is joined to the metal part 2 via the metal plate 3, and so such a coating is not necessary. Especially electrodeposition coating applied to a metal part may degrade the strength of the metal part due to overaging because aluminum alloy of the metal part also is heated. On the contrary, the present embodiment can avoid such degradation of the strength.

Figure 7:
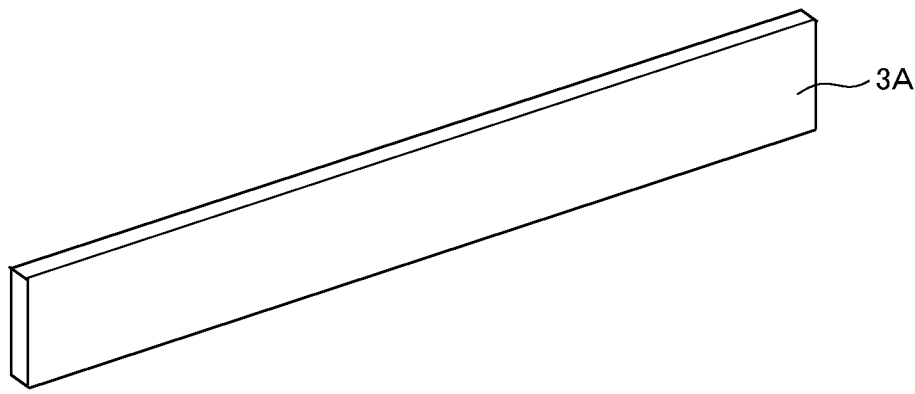
FIG. 7 is a schematic view to explain the step of preparing a metal plate according to a modified example of the present embodiment.
Figure 7:
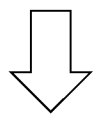
Figure 7:
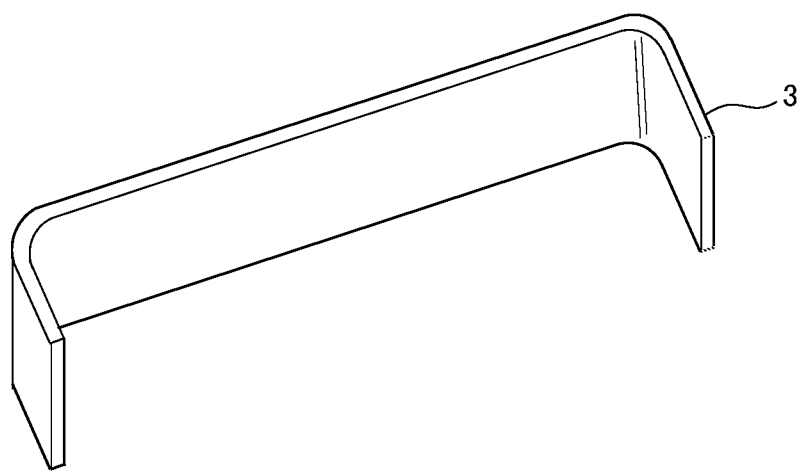

The metal plate 3 of the above embodiment is joined to a part of the surface of the outer wall 21 that is not substantially bent by the bending at the metal plate preparation step S2. The metal plate 3 prepared is therefore a flat plate. For the configuration to reinforce the entire outer wall 21, for example, a plate-like metal plate 3A is prepared as in a modified example of FIG. 7, and a metal plate 3 is prepared by bending this metal plate 3A in accordance with the bending shape of the metal part 2.

Such a bent metal plate 3 does not have alternate concave parts and convex parts on the surface and has a smooth surface because the flat face of the plate-like metal plate 3A is bent in the predetermined direction. Therefore when the fiber-reinforced resin material 5 is attached to the surface of such a metal plate 3 as shown in the upper drawing of FIG. 8 by a similar method to the above, the reinforcement fibers 5a of the fiber-reinforced resin material 5 does not undulate, and the orientation of the fibers is not disturbed.

The thus manufactured reinforcement member 6 is joined to the metal part 2, whereby the metal part 2 can be reinforced more effectively. In this modified example, the plate-like metal plate 3A is bent in accordance with the bending shape of the metal part 2. In another example where the metal part is gently bent, the metal plate 3A may be bent in accordance with such a bending shape of the metal part 2.

The composite member 1 obtained in these embodiments may be used for bumper reinforcement or for a door impact beam for automobile, for example.

That is a detailed description of one embodiment of the present invention. The present invention is not limited to the above-stated embodiments, and the design may be modified variously without departing from the spirits of the present invention defined in the attached claims.

DESCRIPTION OF SYMBOLS

1 Composite member
2 Metal part
2A Tubular member
3 Metal plate
4 Adhesive layer
4A Adhesive
5 Fiber-reinforced resin material (after thermally curing)
5A Fiber-reinforced resin material (before thermally curing)
6 Reinforcement member
9 Welding part
21 Outer wall (after bending)
21A Outer wall (before bending)

What is claimed is:

1. A method for manufacturing a composite member including a tubular metal part and a fiber-reinforced resin material to reinforce the metal part, the method comprising:
   manufacturing the metal part by bending a tubular metal member having a plate-like outer wall extending in the longitudinal direction so that compressive stress acts on a surface of the outer wall and deforms the surface of the outer wall such that alternate concave parts and convex parts are formed at the surface of the outer wall along the longitudinal direction;
   preparing a metal plate by either:
      (i) preparing a flat metal plate, or
      (ii) preparing a bent metal plate by bending or curving a flat metal plate in accordance with a bending shape of the metal part;
   attaching a fiber-reinforced resin material to a surface of the prepared metal plate, the fiber-reinforced resin material including a fiber substrate containing reinforcement fibers having one orientation direction and impregnated with uncured thermosetting resin, followed by thermally curing the thermosetting resin to prepare a reinforcement member; and joining the metal plate of the reinforcement member to the deformed surface of the outer wall of the manufactured metal part such that the orientation direction of the reinforcement fibers is maintained.

2. The method for manufacturing a composite material according to claim 1, wherein the preparing of the reinforcement member attaches the fiber-reinforced resin material to the surface of the metal plate so that the reinforcement fibers are oriented along the longitudinal direction of the metal part.

3. The method for manufacturing a composite member according to claim 1, wherein the tubular member includes aluminum alloy.

4. The method for manufacturing a composite member according to claim 3, wherein the reinforcement fibers include carbon fibers.

* * * * *